United States Patent
Bell et al.

(10) Patent No.: US 9,628,417 B2
(45) Date of Patent: Apr. 18, 2017

(54) TIME CONVERSION IN AN INSTANT MESSAGE

(71) Applicant: International Business Machines Corporation, Armonk, NY (US)

(72) Inventors: Denise A. Bell, Austin, TX (US); Jana H. Jenkins, Raleigh, NC (US); Jeffrey A. Kusnitz, Campbell, CA (US); Sarah R. Plantenberg, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 14/090,180

(22) Filed: Nov. 26, 2013

(65) Prior Publication Data
US 2015/0149561 A1 May 28, 2015

(51) Int. Cl.
*H04L 12/58* (2006.01)
*G06F 3/0481* (2013.01)

(52) U.S. Cl.
CPC ............ *H04L 51/046* (2013.01); *H04L 51/04* (2013.01); *H04L 51/08* (2013.01)

(58) Field of Classification Search
CPC ........ H04L 51/046; H04L 51/08; H04L 51/04
See application file for complete search history.

(56) References Cited

U.S. PATENT DOCUMENTS

| | | | |
|---|---|---|---|
| 7,010,360 B2 | 3/2006 | Atkin et al. | |
| 7,761,525 B2 | 7/2010 | Moraes et al. | |
| 2005/0114191 A1* | 5/2005 | Atkin et al. | G06Q 10/1095 |
| 2005/0114768 A1 | 5/2005 | Atkin et al. | |
| 2007/0150513 A1* | 6/2007 | Vanden Heuvel | G06F 17/278 |
| 2008/0153474 A1 | 6/2008 | Scott | |
| 2010/0228753 A1* | 9/2010 | Jain et al. | G06F 17/278 |
| 2012/0197969 A1 | 8/2012 | Poon | |
| 2013/0007142 A1* | 1/2013 | Rosenberg | H04L 51/14 |

(Continued)

FOREIGN PATENT DOCUMENTS

EP  2309688 B1  10/2012

OTHER PUBLICATIONS

"My SQL now () change timezone", retrieved on Oct. 3, 2013 from website: http://stackoverflow.com/questions/10720887/mysql-now-change-timezone . . . .

(Continued)

*Primary Examiner* — Chris Parry
*Assistant Examiner* — Soe M Hlaing
(74) *Attorney, Agent, or Firm* — Nicholas L. Cadmus; William H. Hartwell; Brian M. Restauro

(57) ABSTRACT

Embodiments of the present invention provide methods, program products and systems for displaying a corrected time included in the text of an instant message. One or more processors determine that an instant message sent from a first user to a second user includes a first time and a first time zone corresponding to the first time and determine that the first time zone corresponding to the first time does not match a second time zone. The one or more processors convert the first time to a second time, wherein the second time is determined based, at least in part, on the first time, the first time zone, and the second time zone. The one or more processors cause the second time to be displayed to the second user.

20 Claims, 3 Drawing Sheets

(56) References Cited

U.S. PATENT DOCUMENTS

2013/0173464 A1* 7/2013 Quillian ................ G06Q 40/02
2014/0149560 A1* 5/2014 Hakami et al. ..... H04L 67/1095

OTHER PUBLICATIONS

Time Zone Converter, "The Time Zone Converter and the Time Zone Reference", retrieved on Oct. 3, 2013 from website: http://www.timezoneconverter.com/linkto.html.

Westhost, "Thread: sendmail & smtp timezone", retrieved on Oct. 3, 2013 from website: http://forums.westhost.com/showthread.php?11170-sendmail-amp-smt . . . .

* cited by examiner

TIME CONVERSION IN AN INSTANT MESSAGE

FIELD OF THE INVENTION

The present invention relates generally to instant messaging, and more particularly to converting a time in an instant message based on the time zone of the instant message sender and recipient.

BACKGROUND OF THE INVENTION

Instant messaging (IM) is a form of communication over the Internet or other networks. IM allows for real-time communication between two or more users. This communication is often text based but may include file sharing or other types of communication. In many cases, instant messaging includes added features. For example, users may see each other via webcams, or communicate directly for free over the Internet using a microphone and headphones or loudspeakers. Typically, users log in to IM servers using IM client programs that are located on client computing devices. These client computing devices range from desktop personal computers to smart phones. Each user who logs in to an IM server does so using a unique instant messaging ID that has been created to identify that particular user. IM client programs may be dedicated client instant messaging programs or functions integrated within other programs.

A time zone is a region on Earth that has a uniform standard time for legal, commercial, and social purposes. It is convenient for areas in close commercial or other communication to keep the same time, so time zones tend to follow the boundaries of countries and their subdivisions. In today's global economy, it is increasingly common for individuals in different areas of the world, and therefore different time zones, to collaborate with each other.

SUMMARY

Aspects of embodiments of the present invention disclose a method, computer program product, and computer system for determining and displaying a corrected time of a time included in the text of an instant message. The method includes one or more processors determining that an instant message sent from a first user to a second user includes a first time and a first time zone corresponding to the first time. The method further includes the one or more processors determining that the first time zone corresponding to the first time does not match a second time zone, wherein the second time zone is the time zone where the second user is scheduled to be, based, at least in part, on the first time. The method further includes the one or more processors converting the first time to a second time, wherein the second time is determined based, at least in part, on the first time, the first time zone, and the second time zone. The method further includes the one or more processors causing the second time to be displayed to the second user.

DETAILED DESCRIPTION

Figure 1:
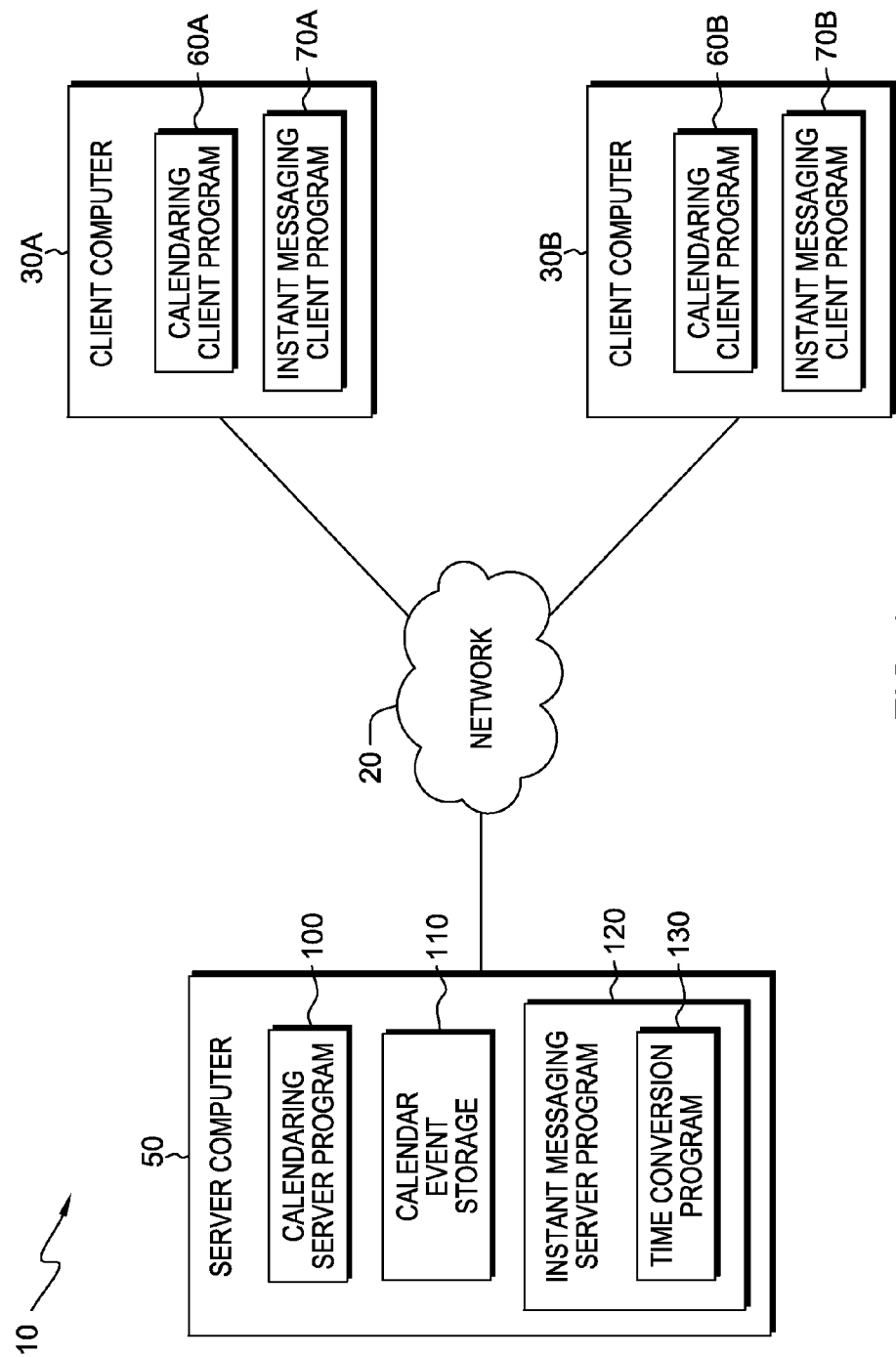
FIG. 1 is a functional block diagram illustrating a distributed data processing environment, in accordance with one embodiment of the present invention.

In today's global economy, it is common for individuals in different parts of the world to collaborate with each other on projects. It is important for these individuals to be mindful of each other's time zones when scheduling meetings and appointments. Often times, instant messaging communication is the most effective way for individuals who are located in different parts of the world to communicate with each other. It may be challenging for these individuals to remember where their colleagues are located and the time zone of each location. When communicating via instant message, it can be confusing to schedule a meeting with a colleague located in another time zone. Aspects of the present invention determine and display a correct time and time zone for a time sent in an instant message.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 depicts a diagram of distributed data processing environment 10 in accordance with one embodiment of the present invention. FIG. 1 provides only an illustration of one embodiment and does not imply any limitations with regard to the environments in which different embodiments may be implemented.

Distributed data processing environment 10 includes client computer 30A, client computer 30B, and server computer 50 interconnected over network 20. Network 20 may be a local area network (LAN), a wide area network (WAN) such as the Internet, a combination of the two or any combination of connections and protocols that will support communications between client computer 30A, client computer 30B, and server computer 50 in accordance with embodiments of the present invention. Network 20 may include wired, wireless, or fiber optic connections. Distributed data processing environment 10 may include additional server computers, client computers, or other devices not shown.

Client computer 30A may be a desktop computer, laptop computer, tablet computer, personal digital assistant (PDA), or smart phone. In general, client computer 30A may be any electronic device or computing system capable of sending and receiving data, and communicating with client computer 30B and server computer 50 over network 20, in accordance with embodiments of the present invention. In the depicted embodiment, client computer 30A includes calendaring client program 60A and instant messaging client program 70A. In one embodiment, client computer 30A includes components described in reference to FIG. 3.

Client computer 30B may be a desktop computer, laptop computer, tablet computer, personal digital assistant (PDA), or smart phone. In general, client computer 30B may be any electronic device or computing system capable of sending and receiving data, and communicating with client computer 30A and server computer 50 over network 20, in accordance with embodiments of the present invention. In the depicted embodiment, client computer 30B includes calendaring client program 60B and instant messaging client program 70B. In one embodiment, client computer 30B includes components described in reference to FIG. 3.

Server computer 50 may be a management server, a web server, or any other electronic device or computing system capable of receiving and sending data. In another embodiment, server computer 50 may represent a server computing system utilizing multiple computers as a server system, such as in a cloud computing environment. In the depicted embodiment, server computer 50 includes calendaring server program 100, calendar event storage 110, instant messaging server program 120, and time conversion program 130. In one embodiment, server computer 50 includes components described in reference to FIG. 3.

Calendaring client programs 60A and 60B execute on client computers 30A and 30B, respectively. Calendaring client programs 60A and 60B may be dedicated client calendaring programs, functions integrated within other programs, or any other program or function that can communicate with calendaring server program 100 and provide a user interface for creating, receiving and responding to calendar events. In one embodiment, a calendar event is an event that includes meetings, appointments, travel plans, and other scheduled events for a user. For example, a user at client computer 30A uses calendaring client program 60A to add, remove, or modify a calendar event. In the depicted embodiment, calendaring client program 60A requires the user to include a time and time zone when scheduling a calendar event. Calendaring client program 60A and 60B each periodically send updated calendar events to calendaring server program 100 over network 20.

Instant messaging (IM) client programs 70A and 70B each execute on client computers 30A and 30B, respectively. IM client programs 70A and 70B may each be dedicated client instant messaging programs, functions integrated within other programs, or any programs that can communicate with instant messaging server program 120 over network 20. IM client programs 70A and 70B each provide a user interface for sending and receiving instant messages. Instant messages are text messages that are transmitted between at least two users. For example, an instant message is sent after a user at client computer 30A types the instant message and instructs IM client program 70A to send the instant message. An instant message conversation may include an exchange between only two users, or it may include multicast communication from one sender to more than one receiver. IM chat may be included as part of a web conferencing service. In the depicted embodiment, an instant message includes a time stamp. A time stamp is a sequence of characters or encoded information identifying the date and time, including the time zone, that the instant message was sent.

IM client programs 70A and 70B each operate to send instant messages to instant messaging server program 120 over network 20, and to receive instant messages from instant messaging server program 120 over network 20.

Calendaring server program 100 operates to receive, forward, and manage calendar events between client computer 30A, client computer 30B, and other client computers (not shown). In one embodiment, calendaring server program 100 stores all calendar events that it manages in calendar event storage 110. In one embodiment, calendaring server program 100 resides on server computer 50. In other embodiments, calendaring server program 100 may reside on another server or another computing device, provided that calendaring server program 100 can communicate with calendaring client programs 60A and 60B and calendar event storage 110.

Calendar event storage 110 is a repository that may be written and read by calendaring server program 100 and may be accessible to instant messaging server program 120 and time conversion server program 130. For example, in certain embodiments, calendar event storage 110 is a database. In another example, in certain embodiments, calendar event storage 110 is a file.

Instant messaging (IM) server program 120 operates to receive, forward, and manage instant messaging communications between IM client programs 70A and 70B. In the depicted embodiment, IM server program 120 resides on server computer 50. In other embodiments, IM server program 120 may reside on another server or another computing device, provided that IM program 120 is accessible to IM client programs 70A and 70B and time conversion program 130.

Time conversion program 130 operates to determine and display a correct time and time zone for a time sent in an instant message. In the depicted embodiment, time conversion program 130 is a function of IM server program 120 on server computer 50. In other embodiments, time conversion program 130 may be a separate program that resides on another server or another computing device, provided that time conversion program 130 can communicate with IM server program 120 and calendar event storage 110. In one embodiment, time conversion program 130 receives instant messages from IM server program 120. In another embodiment, time conversion program 130 receives instant messages from IM client program 70A. In yet another embodiment, time conversion program 130 receives instant messages from IM client program 70B.

In one embodiment, time conversion program 130 determines that an instant message sent by a first user at client computer 30A to a second user at client computer 30B includes a time in the text of the instant message. Time conversion program 130 determines the current time zone of the first user based on the location of the first user at the time that the instant message was sent. Time conversion program 130 also determines which time zone the first user is scheduled to be in at the time that is included in the text of the instant message. If the first user is scheduled to be in a different time zone at the time that is included in the text of the instant message, time conversion program 130 causes the instant message to display a corrected time and time zone in the text of the instant message. The corrected time and time zone, in the text of the instant message, reflect the time zone that the first user is scheduled to be in; based on the time that was included in the original text of the text message.

In one embodiment, time conversion program 130 determines the time zone that the second user is scheduled to be in at the time that is included in the text of the instant message. If the second user is scheduled to be in a time zone that differs from the time zone of the time that is included in the text of the instant message, then time conversion program 130 converts the time in the text of the instant message to the other time zone. Time conversion program 130 sends a signal that causes the instant message to display the corrected time and time zone. The corrected time and time zone reflect the time zone that the second user is scheduled to be in at the time that was included in the original text of the text message.

Figure 2:
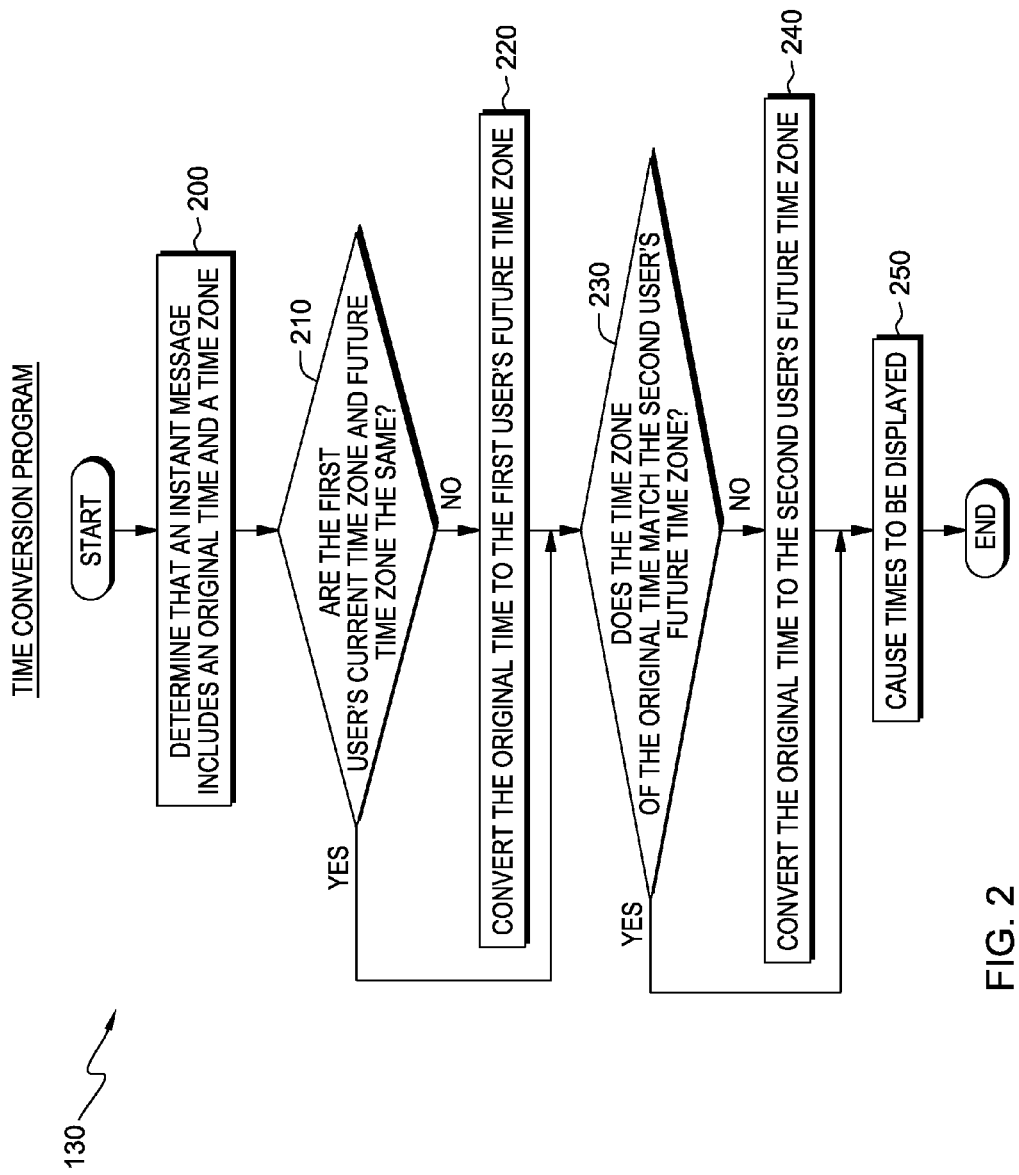
FIG. 2 is a flowchart depicting operational steps of a time conversion program, executing within the environment of FIG. 1, for determining and displaying a correct time and time zone for a time included in the text of an instant message, in accordance with one embodiment of the present invention.

FIG. 2 depicts a flowchart of the steps of time conversion program 130 for determining and displaying a correct time and time zone for a time included in the text of an instant message, in accordance with one embodiment of the present invention.

Initially, in the depicted embodiment, a first user at client computer 30A, using IM client program 70A, sends an instant message to a second user at client computer 30B. The first user types and sends the instant message "Are you available at 9 a.m. on Tuesday to discuss the proposal?" IM client program 70A sends the instant message to IM server program 120 over network 20. IM server program 120 sends the instant message to time conversion program 130. In another embodiment, IM client program 70A sends the instant message to time conversion program 130. In one embodiment, time conversion program 130 receives the instant message from IM server program 120. In another embodiment, time conversion program 130 receives the instant message from IM client program 70A.

In step 200, time conversion program 130 determines that the instant message includes an original time and a time zone in the text of the instant message. In the depicted embodiment, time conversion program 130 uses text analytics and pre-defined rules to determine that the instant message includes an original time. The original time is a time that is included in the text of the instant message. For example, the time "9 a.m. on Tuesday" is the original time in the instant message "Are you available at 9 a.m. on Tuesday to discuss the proposal?" Time conversion program 130 determines that "9 a.m. on Tuesday" is an original time. In another embodiment, time conversion program 130 receives an indication from IM server program 120 that the instant message includes an original time. For example, time conversion program 130 receives a message from IM server program 120 indicating that "9 a.m. on Tuesday" is an original time.

If a time zone is not included in the text of the instant message, time conversion program 130 determines the current time zone of the first user. The current time zone of the first user is the time zone of the location where the instant message was sent from. In the depicted embodiment, time conversion program 130 determines the time zone of the first user from a time stamp included in the instant message. If the time zone is included in the text of the instant message, time conversion program 130 determines the time zone using text analytics.

Time conversion program 130 determines if the first user's current time zone and future time zone are the same (decision step 210). The first user's future time zone is the time zone that the first user is scheduled to be in at the determined original time (e.g. 9 a.m. on Tuesday). In the depicted embodiment, time conversion program 130 sends a request to calendaring server program 100 for the first user's calendar events. Calendaring server program 100 accesses calendar event storage 110 for the first user's calendar events. Calendaring server program 100 determines the first user's calendar events. Calendar events include the dates and times of scheduled meetings for each user and the time zone in which each meeting is scheduled. Calendaring server program 100 sends the calendar events for the first user to time conversion program 130. In another embodiment, time conversion program 130 sends a request to calendar server program 100 for scheduled calendar events that are close to the determined original time. For example, time conversion program 130 sends a request to calendar server program 100 for calendar events that are scheduled within five hours of the determined original time.

In the depicted embodiment, time conversion program 130 receives the calendar information for the first user from calendaring server program 100. Time conversion program 130 uses the calendar information to determine the first user's future time zone. Time conversion program 130 determines, from the first user's calendar information, scheduled events that are close to the determined original time. Events may include meetings, appointments, and travel plans. Each event includes a time and a time zone. For example, time conversion program 130 searches for events that are scheduled within five hours of the determined original time. Time conversion program 130 determines the time and time zone of events scheduled within five hours of the determined original time.

If time conversion program 130 determines that the first user's current time zone and future time zone are the same, then time conversion program 130 proceeds to decision 230 (decision 210—Yes branch). If time conversion program 130 determines that the first user's current time zone and future time zone are not the same, then time conversion program 130 proceeds to step 220 (decision 210—No branch).

In step 220, time conversion program 130 converts the original time to the first user's future time zone. In the depicted embodiment, time conversion program 130 includes a table of time zones. Time conversion program 130 uses the table to calculate the difference between the first user's current time zone and future time zone. For example, time conversion program 130 determined that the first user's current time zone is the Eastern Standard Time (EST) zone in step 200. Time conversion program 130 determined that the first user's future time zone is the Central Standard Time (CST) zone in decision step 210. Time conversion program 130 uses the table to determine that the CST zone is one hour behind the EST zone. Time conversion program 130 calculates the difference between the two time zones and determines that the converted time will be 8 am CST for the first user.

Time conversion program 130 determines if the time zone of the original time matches the second user's future time zone (decision step 230). In the depicted embodiment, time conversion program 130 sends a request to calendaring server program 100 for the second user's calendar events. Calendaring server program 100 accesses calendar event storage 110. Calendaring server program 100 determines the second user's calendar events. Calendaring server program 100 sends the second user's calendar events to time conversion program 130.

In the depicted embodiment, time conversion program 130 uses the calendar events to determine the second user's future time zone. Time conversion program 130 determines, from the second user's calendar events, scheduled events that are close to the original time (e.g. 9 a.m. on Tuesday). For example, time conversion program 130 searches for events that are scheduled within five hours of the original time. Time conversion program 130 determines the time and time zone of events scheduled within five hours of the original time. Time conversion program 130 compares the time zone of the original time (determined in step 200) with the second user's future time zone.

If time conversion program 130 determines that the time zone of the original time matches the second user's future time zone, then time conversion program 130 proceeds to step 250 (decision 230—Yes branch). If time conversion program 130 determines that the time zone of the original time does not match the second user's future time zone, then time conversion program 130 proceeds to step 240 (decision 230—No branch).

In step 240, time conversion program 130 converts the original time to the second user's future time zone. Time conversion program 130 uses the table to calculate the difference between the time zone of the original time and the second user's future time zone. For example, time conversion program 130 determined in step 200 that the time zone of the original time is the EST zone in step 200. Time conversion program 130 determined that the second user's future time zone is the Pacific Standard Time (PST) zone in decision step 230. Time conversion program 130 uses the table to determine that the PST zone is three hours behind the EST zone. Time conversion program 130 calculates the difference between the two time zones and determines that the converted time will be 6 a.m. PST for the second user.

In step 250, time conversion program 130 sends a signal that causes times to be displayed. In the depicted embodiment, time conversion program 130 sends an instruction to IM server program 120 to cause the first converted time (determined in step 220) to be displayed to the first user. For example, time conversion program 130 sends an instruction to IM server program 120 to cause the first converted time (e.g. 8 a.m. CST) to be displayed to the first user instead of the original time (e.g. 9 a.m. EST). IM server program 120, in response to receiving an instruction from time conversion program 130, causes the converted time to be displayed to the first user by sending a command to IM client program 70A. For example, the first user typed the message, "Are you available at 9 a.m. on Tuesday to discuss the proposal?" After the first user sends the instant message, the message "Are you available at 8 a.m. CST on Tuesday to discuss the proposal?" is displayed to the first user. In one embodiment, this step occurs immediately after step 220.

In another embodiment, time conversion program 130 instructs IM server program 120 to cause the second converted time (determined in step 240) to be displayed to the second user. For example, time conversion program 130 sends an instruction to IM server program 120 to cause the second converted time (e.g. 6 a.m. PST) to be displayed to the second user instead of the original time (e.g. 9 a.m. EST). IM server program 120 causes the converted time to be displayed to the second user by sending a command to IM client program 70B. For example, after the first user sends the instant message, the message "Are you available at 6 a.m. PST on Tuesday to discuss the proposal?" is displayed to the second user.

In one embodiment, each converted time is displayed using a different color than the instant message font used by the user viewing the message. For example, when the instant message is displayed to the first user, the time "8 a.m. CST" is displayed in green font, while the rest of the text is displayed in black font. In another embodiment, each converted time is a hyperlink that the first user can select to access calendaring client program 60A. In yet another embodiment, the converted time includes a hover box that displays the original time and time zone that the first user entered (i.e. 9 a.m. EST). A hover box is a section of a user interface that is raised when the user hovers the cursor over a particular area of the user interface.

If time conversion program 130 did not convert the original time for either the first user (in step 220) or second user (in step 240), then time conversion program 130 ends. In one embodiment, time conversion program 130 ends by sending a command to IM server program 120 to forward the original instant message with the original time and time zone to the second user. IM server program 120, in response to receiving the command from time conversion program 130, forwards the instant message received from IM client program 70A to IM client program 70B.

Figure 3:
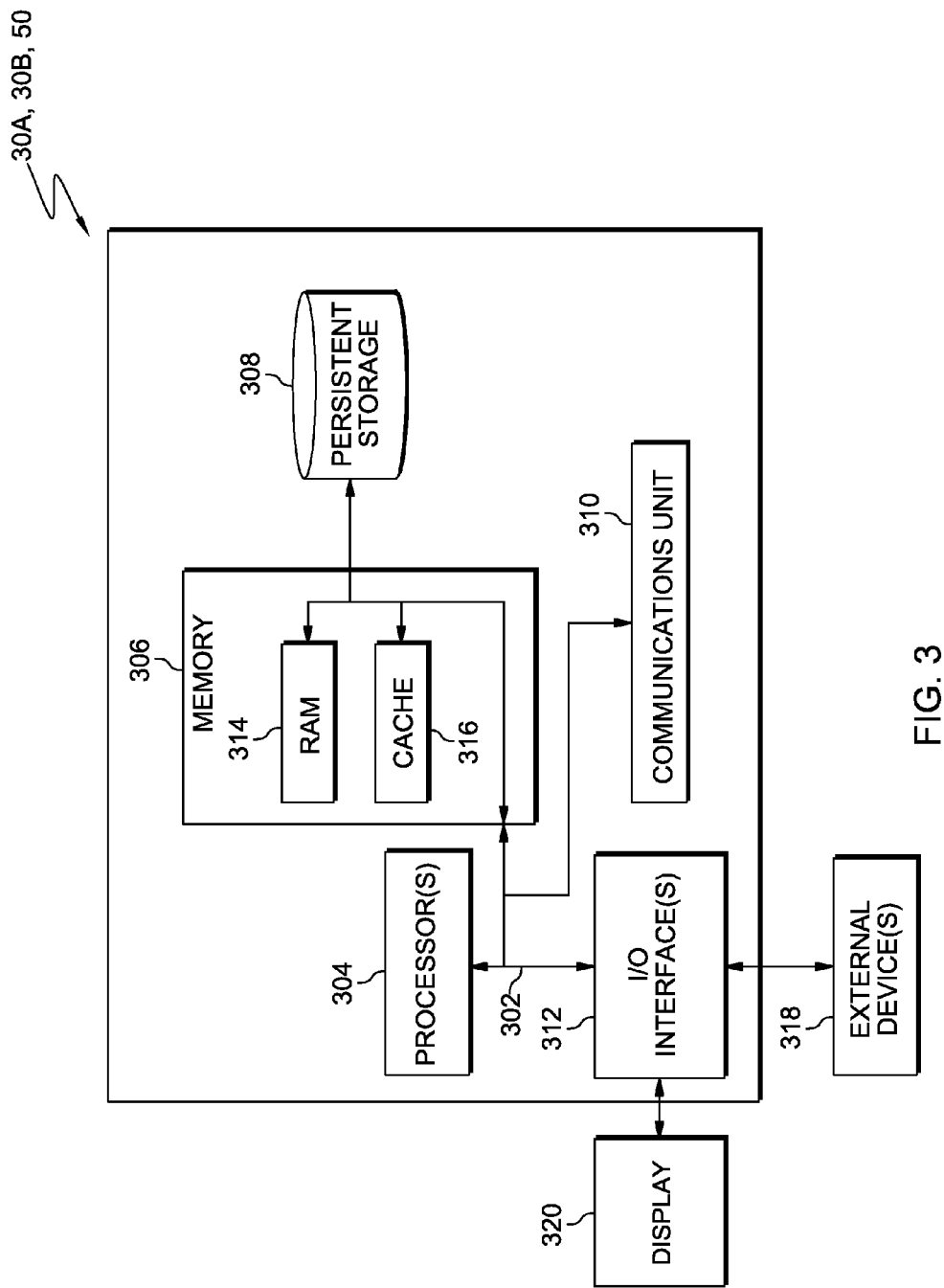
FIG. 3 depicts a block diagram of components of the server computer and the client computers of FIG. 1, in accordance with one embodiment of the present invention.

FIG. 3 depicts a block diagram of components of client computer 30A, client computer 30B, and server computer 50 in accordance with one embodiment of the present invention. It should be appreciated that FIG. 3 provides only an illustration of one implementation and does not imply any limitations with regard to the environments in which different embodiments may be implemented. Many modifications to the depicted environment may be made.

Client computer 30A, client computer 30B, and server computer 50 can each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Calendaring client program 60A and instant messaging client program 70A are each stored in persistent storage 308 of client computer 30A for execution by one or more of the respective computer processors 304 of client computer 30A via one or more memories of memory 306 of client computer 30A. Calendaring client program 60B and instant messaging client program 70B are each stored in persistent storage 308 of client computer 30B for execution by one or more of the respective computer processors 304 of client computer 30B via one or more memories of memory 306 of client computer 30B. Calendaring server program 100, calendar event storage 110, instant messaging server program 120, and time conversion program 130 are each stored in persistent storage 308 of server computer 50 for execution and/or access by one or more of the respective computer processors 304 of server computer 50 via one or more memories of memory 306 of server computer 50. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media capable of storing program instructions or digital information.

The media used by persistent storage 308 may also be removable. For example, a removable hard drive may be used for persistent storage 308. Other examples include optical and magnetic disks, thumb drives, and smart cards inserted into a drive for transfer onto another computer-readable storage medium that is also part of persistent storage 308.

Communications unit 310, in these examples, provides for communications with other servers or devices. In these examples, communications unit 310 includes one or more network interface cards. Communications unit 310 may provide communications through the use of either or both physical and wireless communications links. Calendaring client program 60A and instant messaging client program 70A may each be downloaded to persistent storage 308 of client computer 30A through the communications unit 310 of client computer 30A. Calendaring client program 60B and instant messaging client program 70B may each be downloaded to persistent storage 308 of client computer 30B through the communications unit 310 of client computer 30B. Calendaring server program 100, calendar event storage 110, instant messaging server program 120, and time conversion program 130 may each be downloaded to persistent storage 408 of server computer 50 through the communications unit 410 of server computer 50.

I/O interface(s) 312 allows for input and output of data with other devices that may be connected to client computer 30A, client computer 30B, or server computer 50. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., calendaring client program 60A and instant messaging client program 70A, can be stored on such portable computer-readable storage media and can be loaded onto persistent storage 308 of client computer 30A, respectively, via the respective I/O interface(s) 312 of client computer 30A. Software and data used to practice embodiments of the present invention, e.g., calendaring client program 60B and instant messaging client program 70B, can be stored on such portable computer-readable storage media and can be loaded onto persistent storage 308 of client computer 30B via the respective I/O interface(s) 312 of client computer 30B. Software and data used to practice embodiments of the present invention, e.g., calendaring server program 100, calendar event storage 110, instant messaging server program 120, and time conversion program 130, can be stored on such portable computer-readable storage media and can be loaded onto persistent storage 308 of server computer 50 via the respective I/O interface(s) 312 of server computer 50.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining and displaying a corrected time of a time included in the text of an instant message, the method comprising the steps of:
   one or more processors determining that the text of an instant message, sent from a first user to a second user, includes a first time;
   the one or more processors determining a first time zone corresponding to the first time based, at least in part, on a location of the first user at the time that the instant message was sent to the second user;
   the one or more processors providing a calendar for the second user, wherein the calendar includes one or more event(s) scheduled for the second user that each include a respectively associated time and time zone;
   the one or more processors determining a second time zone where the second user is scheduled to be at the first time based, at least in part, on a comparison of the first time to time(s) and respectively associated time zone(s) of event(s) in the second user's calendar that are close to the first time;
   the one or more processors determining that the first time zone does not match the second time zone;
   the one or more processors converting the first time to a second time, wherein the second time is the first time converted from the first time zone to the second time zone;
   the one or more processors obscuring the first time included in the message from the second user; and
   causing the second time to be displayed in the instant message instead of the obscured first time to the second user as a hyperlink, wherein the hyperlink links to a calendaring program of the second user.

2. The method of claim 1, further comprising the steps of:
   the one or more processors providing a calendar for the first user, wherein the calendar includes one or more event(s) scheduled for the first user that each include a respectively associated time and time zone;
   the one or more processors determining a third time zone where the first user is scheduled to be at the first time based, at least in part, on a comparison of the first time to time(s) and respectively associated time zone(s) of event(s) in the first user's calendar that are close to the first time;
   the one or more processors determining that the first time zone corresponding to the first time does not match the third time zone;
   the one or more processors converting the first time to a third time, wherein the third time is the first time converted from the first time zone to the third time zone; and
   the one or more processors causing the third time to be displayed to the first user.

3. The method of claim 1, wherein the step of the one or more processors converting the first time to a second time, wherein the second time is the first time converted from the first time zone to the second time zone comprises:
   the one or more processors accessing a table that lists time zones and rules for converting between time zones; and
   the one or more processors converting the first time to the second time using the table.

4. The method of claim 2, wherein the step of the one or more processors causing the third time to be displayed to the first user comprises the one or more processors causing the third time to be displayed to the first user in a different format from other content in the instant message sent from the first user to the second user.

5. The method of claim 4, wherein the different format includes a different color.

6. The method of claim 2, wherein the step of the one or more processors causing the third time to be displayed to the first user comprises the one or more processors causing the third time to be displayed to the first user such that the third time is an icon to activate the hover box displaying the first time, wherein when the first user hovers a cursor over the third time, the one or more processors cause the hover box to appear.

7. The method of claim 2, wherein the step of the one or more processors causing the third time to be displayed to the first user comprises the one or more processors causing the third time to be displayed to the first user as a hyperlink, wherein the hyperlink links to a calendaring program of the second user.

8. A computer program product for determining and displaying a correct time for a time included in the text of an instant message, the computer program product comprising:
   one or more computer-readable storage media and program instructions stored on the one or more computer-readable storage media, the program instructions comprising:
   program instructions to determine that the text of an instant message, sent from a first user to a second user, includes a first time;
   program instructions to determine a first time zone corresponding to the first time based, at least in part, on a location of the first user at the time that the instant message was sent to the second user;
   program instructions to provide a calendar for the second user, wherein the calendar includes one or more event(s) scheduled for the second user that each include a respectively associated time and time zone;
   program instructions to determine a second time zone where the second user is scheduled to be at the first time based, at least in part, on a comparison of the first time to time(s) and respectively associated time zone(s) of event(s) in the second user's calendar that are close to the first time;

program instructions to determine that the first time zone does not match the second time zone;

program instructions to convert the first time to a second time, wherein the second time is the first time converted from the first time zone to the second time zone;

program instructions to obscure the first time included in the message from the second user; and program instructions to cause the second time to be displayed in the instant message instead of the obscured first time to the second user as a hyperlink, wherein the hyperlink links to a calendaring program of the second user.

9. The computer program product of claim 8, further comprising:

program instructions, stored on the one or more computer-readable storage media, to provide a calendar for the first user, wherein the calendar includes one or more event(s) scheduled for the first user that each include a respectively associated time and time zone;

program instructions, stored on the one or more computer-readable storage media, to determine a third time zone where the first user is scheduled to be at the first time based, at least in part, on a comparison of the first time to time(s) and respectively associated time zone(s) of event(s) in the first user's calendar that are close to the first time;

program instructions, stored on the one or more computer-readable storage media, to determine that the first time zone corresponding to the first time does not match the third time zone;

program instructions, stored on the one or more computer-readable storage media, to convert the first time to a third time, wherein the third time is the first time converted from the first time zone to the third time zone; and program instructions, stored on the one or more computer-readable storage media, to cause the third time to be displayed to the first user.

10. The computer program product of claim 8, wherein the program instructions to convert the first time to the second time, wherein the second time is the first time converted from the first time zone to the second time zone comprise:

program instructions to access a table that lists time zones and rules for converting between time zones; and program instructions to convert the first time to the second time using the table.

11. The computer program product of claim 9, wherein the program instructions to cause the third time to be displayed to the first user comprise program instructions to cause the third time to be displayed to the first user in a different format from other content in the instant message sent from the first user to the second user.

12. The computer program product of claim 11, wherein the different format includes a different color.

13. The computer program product of claim 9, wherein the program instructions to cause the third time to be displayed to the first user comprise program instructions to cause the third time to be displayed to the first user such that the third time is an icon to activate the hover box displaying the first time, wherein when the first user hovers a cursor over the third time, the one or more processors cause the hover box to appear.

14. The computer program product of claim 9, wherein the program instructions to cause the third time to be displayed to the first user comprise program instructions to cause the third time to be displayed to the first user as a hyperlink, wherein the hyperlink links to a calendaring program of the second user.

15. A computer system for determining and displaying a correct time for a time included in the text of an instant message, the computer system comprising:

one or more computer processors;

one or more computer-readable storage media;

program instructions stored on the computer-readable storage media for execution by at least one of the one or more processors, the program instructions comprising:

program instructions to determine that the text of an instant message, sent from a first user to a second user, includes a first time;

program instructions to determine a first time zone corresponding to the first time based, at least in part, on a location of the first user at the time that the instant message was sent to the second user;

program instructions to provide a calendar for the second user, wherein the calendar includes one or more event(s) scheduled for the second user that each include a respectively associated time and time zone;

program instructions to determine a second time zone where the second user is scheduled to be at the first time based, at least in part, on a comparison of the first time to time(s) and respectively associated time zone(s) of event(s) in the second user's calendar that are close to the first time;

program instructions to determine that the first time zone does not match the second time zone;

program instructions to convert the first time to a second time, wherein the second time is the first time converted from the first time zone to the second time zone;

program instructions to obscure the first time included in the message from the second user; and program instructions to cause the second time to be displayed in the instant message instead of the obscured first time to the second user as a hyperlink, wherein the hyperlink links to a calendaring program of the second user.

16. The computer system of claim 15, further comprising:

program instructions, stored on the one or more computer-readable storage media for execution by at least one of the one or more processors, to provide a calendar for the first user, wherein the calendar includes one or more event(s) scheduled for the first user that each include a respectively associated time and time zone;

program instructions, stored on the one or more computer-readable storage media for execution by at least one of the one or more processors, to determine a third time zone where the first user is scheduled to be at the first time based, at least in part, on a comparison of the first time to time(s) and respectively associated time zone(s) of event(s) in the first user's calendar that are close to the first time;

program instructions, stored on the one or more computer-readable storage media for execution by at least one of the one or more processors, to determine that the first time zone corresponding to the first time does not match the third time zone;

program instructions, stored on the one or more computer-readable storage media for execution by at least one of the one or more processors, to convert the first time to a third time, wherein the third time is the first time converted from the first time zone to the third time zone; and program instructions, stored on the one or more computer-readable storage media for execution by at least one of the one or more processors, to cause the third time to be displayed to the first user.

17. The computer system of claim 15, wherein the program instructions to convert the first time to the second time, wherein the second time is the first time converted from the first time zone to the second time zone comprise:

program instructions to access a table that lists time zones and rules for converting between time zones; and program instructions to convert the first time to the second time using the table.

18. The computer system of claim 16, wherein the program instructions to cause the third time to be displayed to the first user comprise program instructions to cause the third time to be displayed to the first user in a different format from other content in the instant message sent from the first user to the second user.

19. The computer system of claim 16, wherein the program instructions to cause the third time to be displayed to the first user comprise program instructions to cause the third time to be displayed to the first user such that the third time is an icon to activate the hover box displaying the first time, wherein when the first user hovers a cursor over the third time, the one or more processors cause the hover box to appear.

20. The computer system of claim 16, wherein the program instructions to cause the third time to be displayed to the first user comprise program instructions to cause the third time to be displayed to the first user as a hyperlink, wherein the hyperlink links to a calendaring program of the second user.

* * * * *